July 21, 1942.  S. S. ROBINSON, JR  2,290,712
FERTILIZER DISTRIBUTOR
Filed Nov. 28, 1939  4 Sheets-Sheet 1
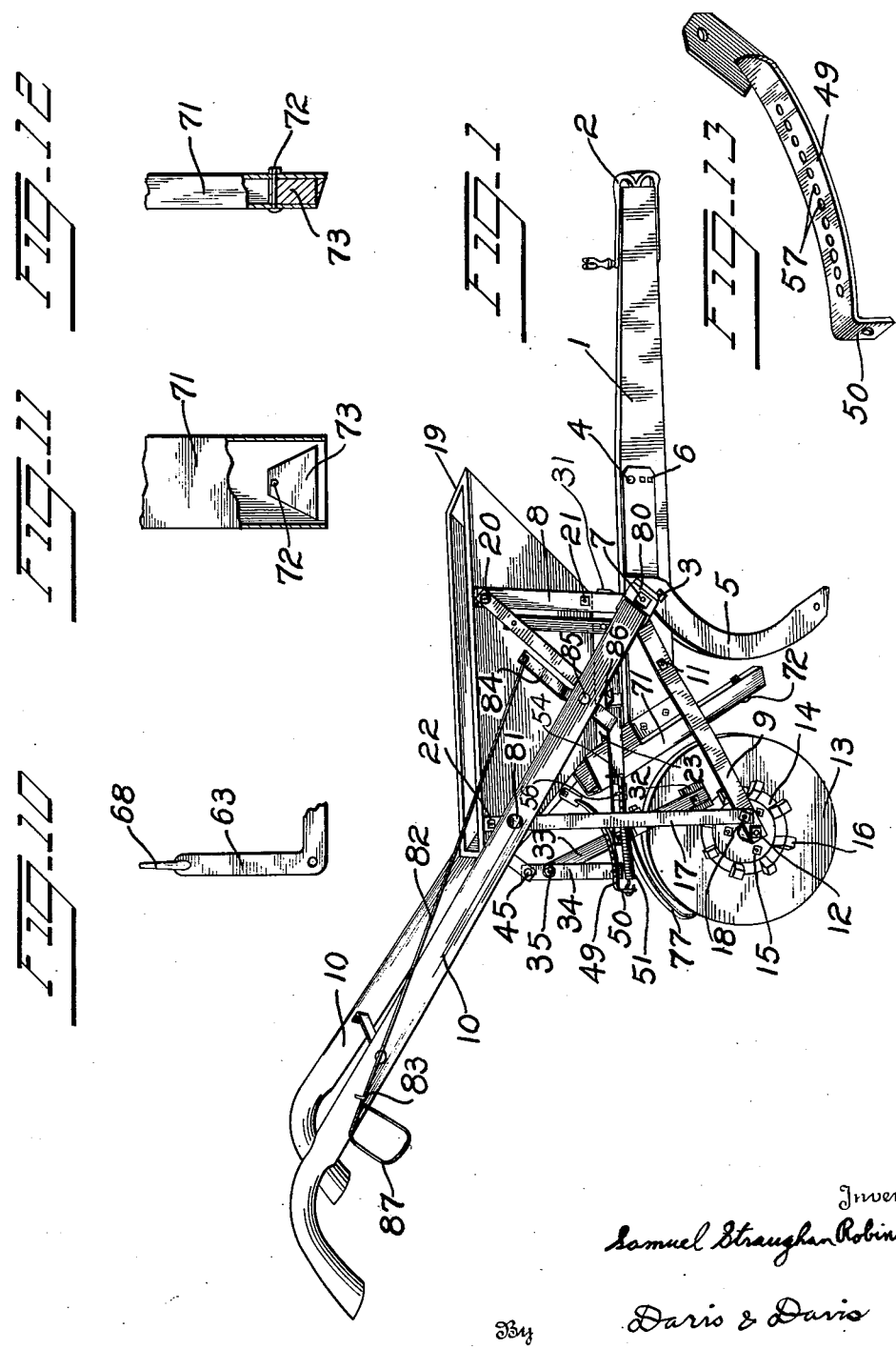
Inventor
Samuel Straughan Robinson, Jr.
By Davis & Davis
Attorneys

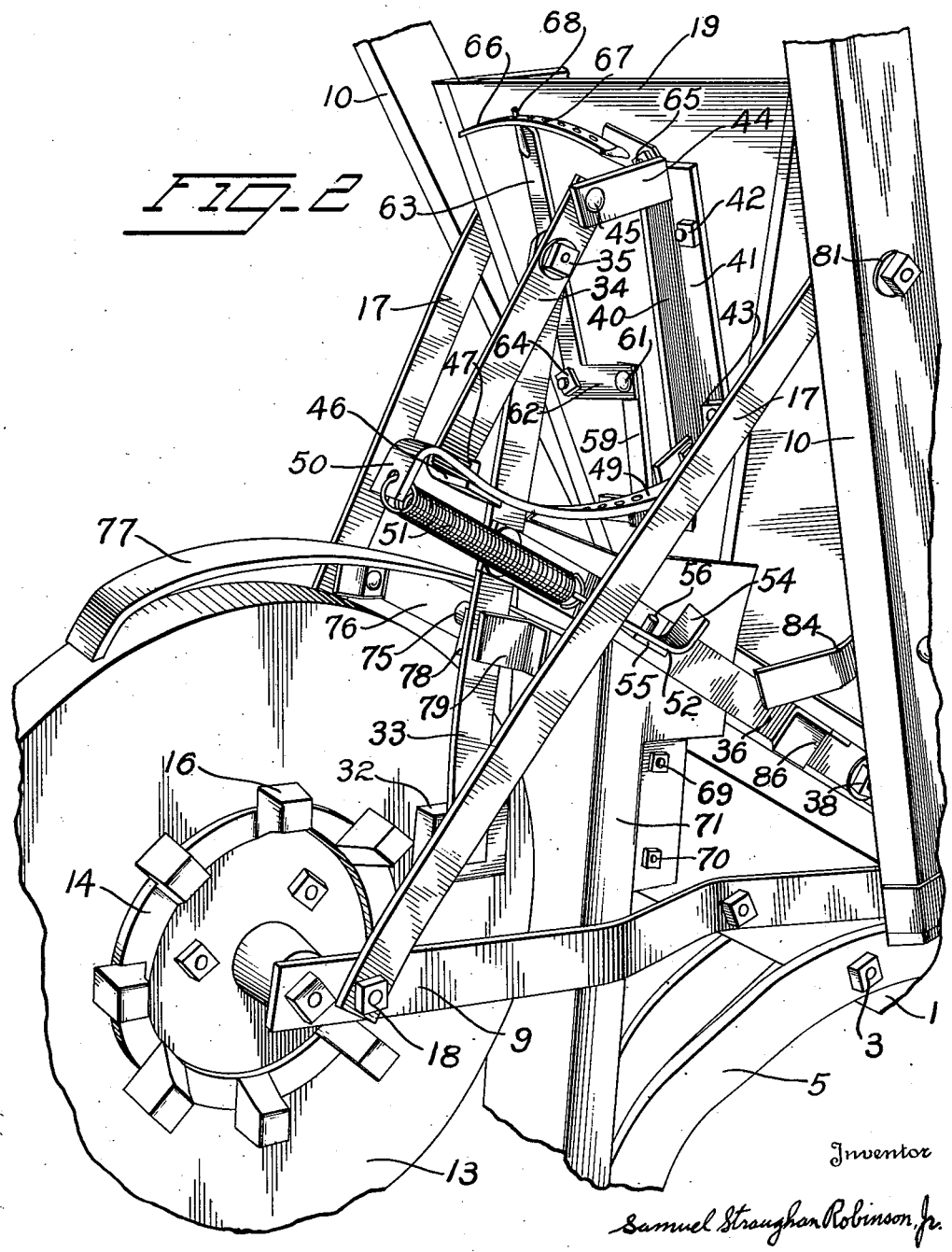

July 21, 1942.    S. S. ROBINSON, JR    2,290,712
FERTILIZER DISTRIBUTOR
Filed Nov. 28, 1939    4 Sheets-Sheet 3
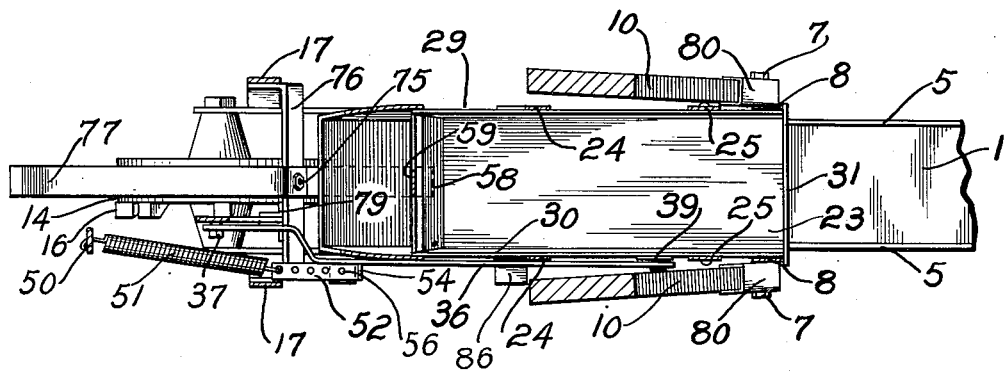
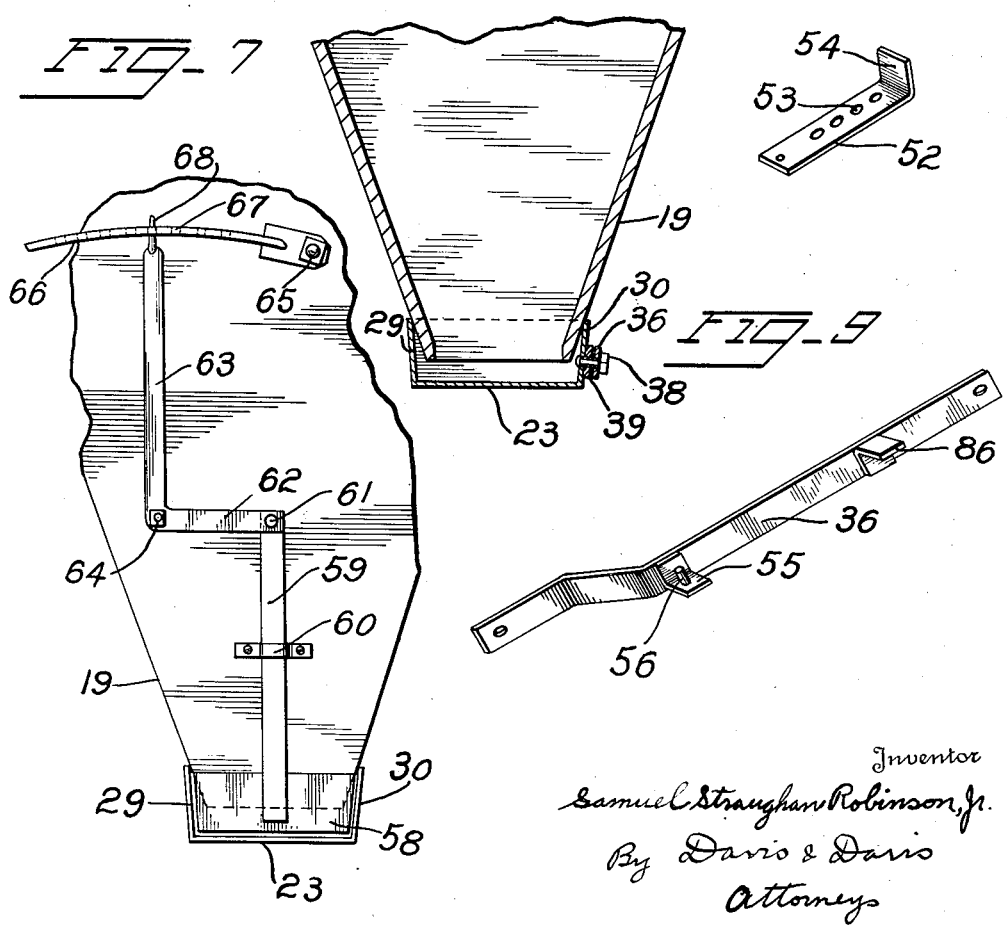
Inventor
Samuel Straughan Robinson, Jr.
By Davis & Davis
Attorneys

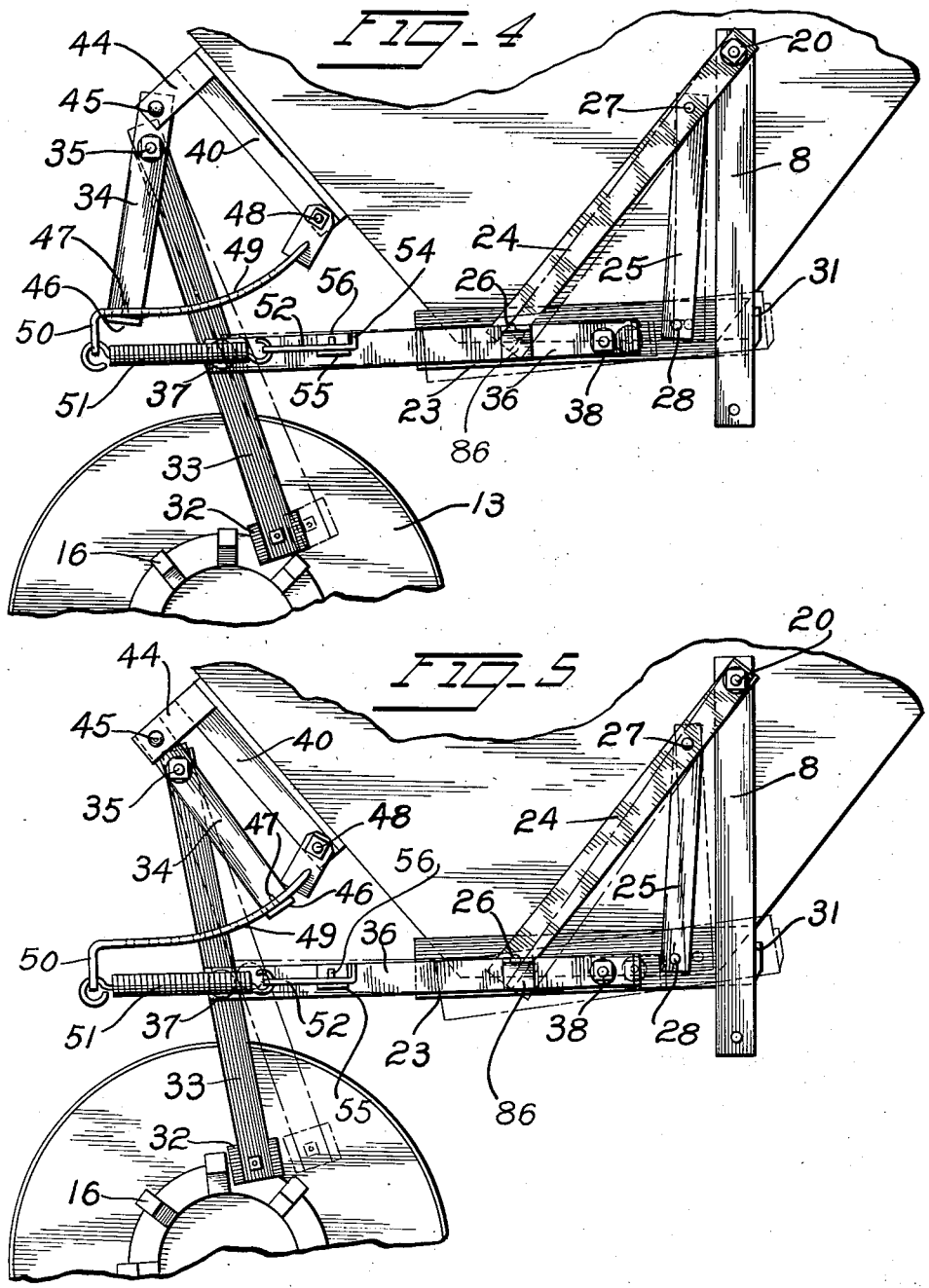

Patented July 21, 1942

2,290,712

UNITED STATES PATENT OFFICE 2,290,712

FERTILIZER DISTRIBUTOR

Samuel Straughan Robinson, Jr., Albany, Ga., assignor to Lilliston Implement Company, Albany, Ga., a corporation of Georgia Application November 28, 1939, Serial No. 306,569

5 Claims. (Cl. 221—120)

This invention relates to improvements in fertilizer distributors and it consists in the combination, construction and arrangements herein described and claimed.

One object of the invention is to provide a fertilizer distributor having a vibratory tray for agitating the fertilizer and means for adjusting the degree of agitation, together with the rapidity of flow of the fertilizer from the distributor and means whereby the vibratory mechanism may be instantly thrown out of operative relation.

Another object is to provide a vibratory tray pivotally mounted at but two points and mechanically combined with a tension spring and tappet arm so that all adjoining links are held in firm contact with each other, thereby eliminating noises and reducing wear to a minimum, and mechanically combined in such a manner as to provide an even distribution of the fertilizer at all times from the said distributor.

A further object of the invention is to effect improvements in the construction of the adjustment mechanism for such distributors whereby all set screws and threaded adjustments may be eliminated and the adjustment mechanism so constructed that quick, easy, positive and secure adjustments may be made in the field by hand, without the need of tools.

Other objects and advantages of this invention are set forth in the following description, taken with the accompanying drawings; and the novel features thereof are pointed out in the appended claims. The disclosure, however, is illustrative only and I may make changes in detail, especially in matters of shape, size and arrangement of parts within the principle of the invention, to the full extent indicated by the broad and general meanings of the terms in which the appended claims are expressed.

On the drawings—

Figure 1 is a side elevation of a fertilizer distributor embodying the present invention.

Figure 2 is an enlarged perspective rear view of the same showing the adjustment mechanism.

Figure 3 is a top view of the vibratory tray, and actuating mechanism, the upper portion thereof being for convenience broken away.

Figure 4 is an enlarged side elevation of the fertilizer distributor showing the tappet arm adjustment means set for the minimum vibratory movement and showing in such adjusted position by broken lines the pivotal movement of the vibratory tray with the tappet arm in throw position.

Figure 5 is an enlarged side elevation of the fertilizer distributor showing the tappet arm adjustment means set for the maximum vibratory movement and showing in such adjusted position by broken lines the pivotal movement of the vibratory tray with the tappet arm in throw position.

Figure 6 is an enlarged sectional view of the vibratory tray and portion of the hopper taken through the pivotal connection of the reciprocating arm and the said tray.

Figure 7 is an enlarged elevation of a portion of the back of the hopper and vibratory tray showing the adjustment mechanism for regulating the discharge gate.

Figure 8 is an enlarged perspective view of the spring adjustment strap.

Figure 9 is an enlarged perspective view of the reciprocating arm or link which connects the tappet or knocker arm and the vibratory tray.

Figure 10 is a front elevation of the adjustment arm for regulating the discharge gate showing the structure thereof.

Figure 11 is a sectional view of the front of the fertilizer distributor tube at the end thereof showing the dispersion block.

Figure 12 is a sectional view of the side of the same.

Figure 13 is a perspective view of the tappet adjustment arm.

On the drawings the same numerals identify the same parts throughout.

My improved fertilizer distributor, Figure 1, has a main beam 1, provided with the usual clevis 2, and has attached to the main beam 1, by bolts 3 and 4, the bifurcated upper end of a standard or foot 5. The bolt 4 may be engaged with either of a series of adjusting openings 6, with which said standard is provided.

Attached to the opposite sides of the beam 1, by the bolt 7, are the vertically extending bars 8, the forked arms 9, and the handle beams 10. The forked arms 9 are further attached to the beam 1 by bolt 11 and extend rearward and downward along the opposite sides of the beam 1. The rear portion of the said arms 9 carry the axle 12, upon which the wheel 13 is journaled. A plate 14 is fastened to the face of the wheel 13 by bolts 15, the said plate 14 having lugs 16 projecting therefrom at suitable intervals.

The vertically extending bars indicated by numeral 17 are secured at the lower end thereof to the forked arms 9 by bolt 18. Mounted between the vertically extending bars 17 and 8 is an open top hopper 19, having also an open underside. The vertically extending bars 8 are fastened forward to the opposite sides of the hopper 19 by the bolts 20 and 21, while bars 17 are fastened rearward to the opposite sides of the hopper 19 aforesaid by the bolt 22.

Positioned directly beneath the open underside of the hopper 19 is the vibratory tray 23 having an open back end and upwardly projecting walls formed at the sides 29 and 30. The upper edges of the side walls 29 and 30 are adapted to fit contiguous with the side walls of the hopper 19, Figures 3, 6 and 7, and the said tray has formed at the front end thereof an upwardly projecting wall 31, Figures 3, 4 and 5. The said wall 31 extends laterally outward beyond the side walls 29 and 30, the purpose of which will hereinafter appear. The said vibratory tray 23 is pivotally supported directly beneath the open underside of said hopper 19, Figures 4 and 5, by the arms, bars or supporting members 24 and 25, which traverse the opposite sides of the said hopper 19, the arms or bars 24 being pivotally connected by the bolt 20 to the upper end of the bars 8 fastened on opposite sides of the hopper 19. The said arms or bars 24 are fastened at 26 to the opposite sides of the vibratory tray 23 and at 27 are secured to the upper portion of the arms or bars 25, the said arms 25 being fastened on the opposite sides of the said tray 23, at 28.

As previously described the wheel 13 is provided with a circular series of laterally projecting lugs 16, which as the wheel turns in rolling contact with the ground, strike successively against a block or head 32, Figures 2, 4 and 5, constructed at the end of the tappet arm 33, which is pivotally secured to the adjustment arm 34 by the pivotal bolt 35. The tappet arm 33 is further operatively connected to the end of the reciprocating arm 36 by the pivotal bolt 37, the said reciprocating arm 36 being pivotally connected at the opposite end thereof to the side wall 30 of the vibratory tray 23, by the pivotal bolt 38. Formed integral with the side wall 30 of the vibrating tray 23, and placed between the said wall and reciprocating arm 36, at the pivotal connection thereof, is the spacing block 39, Figures 3 and 6.

Thus as movement is imparted by the lugs 16 of the revolving wheel 13, striking the head 32 of the tappet arm 33, the same is conveyed to the reciprocating arm 36, and such movement is thereby transmitted to the vibratory tray 23 which is oscillated in accordance therewith.

Mounted vertically on the rear wall of the hopper 19, Figures 2, 4 and 5, is a member which is preferably of angle iron construction, including a depending wing 40, and a wing 41 extending at right angles thereto, and fastened to the wall of the said hopper 19 by the bolts 42 and 43.

At the upper end of the depending wing 440, formed integral therewith and substantially at righ angles thereto is a projecting arm 44, to which is connected by the pivotal bolt 45, a radial adjustment arm 34 having pivotally secured thereto by the bolt 35, as previously explained, the tappet arm 33. The said radial adjustment arm 34 has provided at the lower end thereof, and projecting laterally substantially at right angles thereto, an ear or flange 46 having a pin bolt 47 extending vertically therefrom, the purpose of which will appear hereinafter.

A segmental guide arm 49 is pivotally fastened at the lower end of the depending wing 40 by the pivot bolt 48. The said segmental guide arm is curved along the periphery of a circle having as its center the pivotal point of the radial guide arm 34. Projecting radially downward from the said segmental guide arm 49, and substantially at a right angle thereto is the ear 50, to which is fastened one end of a tension spring 51, the spring having connected at the opposite end thereof a tension adjustment strap 52, said adjustment strap 52 being perforated with adjustment holes 53, Figure 8, and having provided a vertically projecting ear 54. Formed integral with the previously mentioned reciprocating arm 36, and projecting laterally and substantially at a right angle thereto, Figures 2, 4, 5 and 9, is the part 55 having a vertically projecting pin bolt 56 adapted to engage or be inserted in the perforated tension adjustment holes 53 in the strap 52, the ear 54 of the said strap 52 providing a convenient means for making changes in such adjustments by hand.

The segmental guide arm 49 previously noted has also provided therein suitable perforated adjustment holes 57, Figure 13. The pin bolt 47 extending vertically from the laterally projecting ear 46 of the radial adjustment arm 34, is adapted to engage and be inserted through the perforated adjustment holes 57, the said laterally projecting ear 46 fitting beneath the segmental guide arm 49, and limiting thereby the downward pivotal movement of the said arm 49 caused by the tension of the spring 51. The tension of the spring 51 thus holding the segmental guide arm 49 and the radial adjustment arm 34 securely in the adjusted position.

The tension of the spring 51 further acts upon the reciprocating arm 36 so as to cause the said arm 36, the tappet arm 33 and the vibratory tray 23 to tend to move in the direction of the spring tension after having been projected in the opposite direction by the effect of tappet projections 16 on the tappet arm 33. This movement in the direction of the tension of the spring 51 is limited by the forward wall 31 of the said vibratory tray 23. The ends of the said wall 31 project laterally outward, as previously described, so as to strike at the rest position shown in Figures 3, 4 and 5, the forward edge of the arms 8, thereby limiting the pivotal movement of the said tray 23 in the direction of the tension of the spring 51 and holding in the rest position the bottom of the said tray 23 in the position substantially as shown in Figures 4. and 5.

The effect of the pivotal movement of the radial adjustment arm 34 is readily seen from Figures 4 and 5. For the minimum vibratory movement the pin bolt 47 of the radial adjustment arm 34 is disposed in the extreme rearward adjustment hole 57, as shown in Figure 4, thereby moving the pivotal point of the tappet arm 33 to the extreme backward position and shifting the head 32 of the tappet arm 33 less in the path of the revolving tappet projections 16. The resultant slight pivotal movement of the vibratory tray 23 caused by such adjustment is illustrated by broken lines in Figure 4.

For the maximum pivotal movement the pin bolt 47 of the radial adjustment arm 46 is placed in the opposite extreme adjustment hole 57, as shown in Figure 5, thereby moving the pivotal point of the tappet arm 33 to the extreme forward position and thereby tending to shift the head of the tappet arm 32 full in the path of the revolving tappet projections 16. The relative greater pivotal movement of the said vibratory tray 23 caused by such adjustment is illustrated by broken lines in Figure 5.

Positioned in the rear of the hopper is a door or slide 58, Figures 2, 3 and 7, which controls the discharge opening of the vibratory tray 23, and thereby regulates the amount of discharge of the material therefrom. The said door is adapted to be raised or lowered by an arm 59 fastened thereto which is slidably mounted on the rear wall of the said hopper 19 by a clasp 60.

The said arm 59 is pivotally connected at the upper end thereof by a pivotal bolt 61 to the arm 62, which is formed integral with and substantially at right angles to the radial adjustment arm 63. The arms 62 and 63 are pivotally connected at the juncture thereof to the rear wall of the said hopper 19 by the pivotal bolt 64. Further pivotally fastened to the rear wall of the said hopper 19, by the pivotal bolt 65, is the segmental guide arm 66 curved along the periphery of a circle having as its center the pivotal point of the arms 62 and 63. The said segmental guide arm 66 has provided therein suitable perforated adjustment holes 67, adapted to engage the adjustment pin 68, which is provided at the extreme end of the radial adjustment arm 63, and formed integral therewith, Figure 10. The said pin 68 is preferably formed as shown with a slight taper, the lower part thereof being greater in diameter than the said adjustment holes 67, thereby providing a tight fit upon the upper portion of the said adjustment pin 68 being inserted through a perforated adjustment hole 67, and further providing a means for retaining a tight fit though the diameter of the adjustment holes 67 become enlarged through wear.

Fastened to the rear of the beam 1, by the bolts 69 and 70 is the chute 71, Figures 1 and 2, which is designed to extend any desired distance upward, as shown in Figure 1, to receive fertilizer from the rear or delivery end of the vibratory tray 23. Chute 71 may extend to any desired distance downward so as to direct the fertilizer received into the furrow or upon the ground. Removably fastened by the bolt 72 in the said chute 71 and at the lower end thereof is the triangular block 73 adapted to divide the flow of fertilizer material and direct the same to the sides of the distributor, Figures 1, 11 and 12.

Fastened between the supporting bars 17, and formed integral therewith, Figures 2 and 3, is the spacing bar 76 having fastened thereto by the bolt 75 the scraper 77 adapted to scrape the surface of the wheel 13, and remove such matter as may tend to accumulate thereon. Further fastened to the said spacing bar 76 are the guide members 78 and 79 adapted to traverse the opposite sides of the tappet arm 33, thereby limiting the side movement of the said arm 33. Furthermore, the forward pivotal movement of the tappet arm 33, caused by the revolving of the tappet projections 16, is limited by the spacing bar 76, which therefore likewise limits the pivotal downward movement of the vibratory tray 23.

Fastened to the opposite sides of the beam 1, by the bolt 7 and strap 80, are suitable handle beams 10, which extend rearward and upward along opposite sides of the hopper 19, being further fastened by bolt 81 to the bar 17, Figures 1, 2 and 3.

In order to enable the vibratory mechanism to be instantly thrown out of operation to prevent the loss of fertilizer in traveling from field to field, and in turning around at the end of rows, an operating rod 82 is slidably mounted on one of the handles 10 by means of an eye or clip 83. The said rod 82 is fastened at the lower end thereof to an actuating arm or member 84 pivoted to the lower portion of the handles 10 by the pivotal bolt 85, which actuating arm 84 is adapted to engage the laterally projecting member 86 formed integral with the reciprocating arm 36, and thereby project the reciprocating arm 36 to the limit of its forward movement, thus pivoting the tappet arm 33 to a position out of engagement with the revolving tappet projections 16. The upper end of the operating rod is provided with a handle loop 87 having a curved upper portion located adjacent to the grip portion of the handle 10, and adapted to be readily grasped by the operator without releasing the handles 10.

Having thus described my invention, what I claim as my invention and desire to secure by Letters Patent is:

1. A fertilizer distributor comprising a pivotally mounted receiver, an agitator wheel having projections thereon, a pivotally mounted segmental guide arm having perforated adjustment holes formed therein, a pivoted adjustment arm being adapted to engage the said adjustment holes, a tappet arm pivotally connected to the said adjustment arm, the said tappet arm arranged in the path of the said projections and linked pivotally to the said receiver, the said tappet arm being adapted to periodically pivot the said receiver downward, the said adjustment arm being adapted to move the pivotal point of the said tappet arm to adjust the said tappet arm to give more or less throw thereto, a spring connected to said link in opposition to the said downward pivotal movement of the said receiver and the opposite end of the said spring being connected to the said segmental guide arm and adapted to fasten the said segmental guide arm and the said adjustment arm in the adjusted position.

2. The combination comprising, a beam, mounted on said beam a hopper having an open under side, a tray having an open end disposed under the said hopper, bars pivoted to the sides of the said hopper and fastened to the sides of the said tray, an agitator wheel having projecions thereon, a segmental guide arm having adjustable holes formed therein, an adjustment arm pivoted to the said hopper having a pin bolt adapted to engage the said adjustment holes, a tappet arm pivoted to the said adjustment arm, the said tappet arm arranged in the path of the said projections and linked pivotally to the said tray, the said tappet arm being adapted to periodically pivot the said tray downward, the said adjustment arm being adapted to move the pivotal point of the said tappet arm, a spring connected to said link in opposition to the said downward pivotal movement of the said tray and the opposite end of the said spring being attached to the said segmental guide arm, means for limiting the upward pivotal movement of the said tray in response to the tension of the spring, means for adjusting the tension of the spring and means for throwing into and out of operation the said tray.

3. In a fertilizer distributor of the class wherein a vibratory tray is operably connected to a tappet arm actuated by means of projecting members provided on an agitator wheel, the said tappet arm being pivotally connected to an adjustment arm whereby the pivot point of the said tappet arm is adjustably regulated so as to position the said tappet arm more or less in the path of the projecting members on the agitator wheel aforesaid; characterized by the fact that there is combined with the said adjustment arm a laterally projecting ear mounted at one end of the said adjustment arm, a pin bolt extending vertically from the said ear, a pivotally mounted segmental guide arm having adjustment holes provided therein, the pin bolt of the adjustment arm aforesaid being adapted to be engaged in the said adjustment holes whereby the said adjustment arm is held in adjusted position, a spring connected at one end to the said segmental guide arm and the said spring connected at the other end to the said tappet arm in opposition to pivotal movement of the said tappet arm by the projecting elements aforesaid provided on the said agitator wheel.

4. In a fertilizer distributor of the class wherein a vibratory tray is operably connected to a tappet arm actuated by means of projecting members provided on an agitator wheel, the said tappet arm being pivotally connected to an adjustment arm whereby the pivot point of the said tappet arm is adjustably regulated so as to position the said tappet arm more or less in the path of the projecting members on the agitator wheel aforesaid; characterized by the fact that there is combined with the said adjustment arm a pivotal guide arm and locking means adapted to engage the said adjustment arm and the said guide arm, a spring tension means whereby the said adjustment arm and the guide arm are held in engaging relationship and the said spring tension means connected in opposition to movement of the said tappet arm by the projecting elements provided on the said agitator wheel.

5. In a fertilizer distributor of the class wherein a vibratory tray is operably connected to a tappet arm actuated by means of projecting elements provided on an agitator wheel, the said tappet arm being pivotally connected to an adjustment arm whereby the pivotal point of the said tappet arm is adjusted so as to give more or less throw to the said tappet arm; characterized by the fact that there is combined with the said adjustment arm a guide arm having means for engaging the said adjustment arm and means for holding the said guide arm under spring tension whereby the adjustment arm and the guide arm are fastened in engaging relationship and means whereby the said guide arm may be positioned in a disengaged relationship with the said adjustment arm, and the said means for holding the said guide arm under spring tension operably connected in opposition to pivotal movement of the said tappet arm by the projecting elements provided on the said agitator wheel.

SAMUEL STRAUGHAN ROBINSON, Jr.